Oct. 3, 1944.     L. D. McCLEARY     2,359,657
PLANETARY ENGINE
Filed Aug. 13, 1942     5 Sheets-Sheet 1

Fig. 1.

INVENTOR
LORIN D. McCLEARY,
By Minturn & Minturn,
ATTORNEYS

Oct. 3, 1944.  L. D. McCLEARY  2,359,657
PLANETARY ENGINE
Filed Aug. 13, 1942  5 Sheets-Sheet 3

INVENTOR
LORIN D. McCLEARY,
By Minturn & Minturn,
ATTORNEYS

Oct. 3, 1944.  L. D. McCLEARY  2,359,657
PLANETARY ENGINE
Filed Aug. 13, 1942  5 Sheets-Sheet 4

INVENTOR
LORIN D. McCLEARY,
BY Minturn & Minturn,
ATTORNEYS

Oct. 3, 1944.   L. D. McCLEARY   2,359,657
PLANETARY ENGINE
Filed Aug. 13, 1942   5 Sheets-Sheet 5

INVENTOR
LORIN D. McCLEARY
BY Minturn & Minturn,
ATTORNEYS

Patented Oct. 3, 1944

2,359,657

UNITED STATES PATENT OFFICE 2,359,657

PLANETARY ENGINE

Lorin D. McCleary, Indianapolis, Ind.

Application August 13, 1942, Serial No. 454,715

15 Claims. (Cl. 123—43)

This invention relates to a rotary type engine of a planetary nature involving two oppositely revolving frames, each acting as a flywheel wherein one of the frames is driven by reaction forces of explosion pressures within cylinders and the other frame driven through a leverage system actuated by pistons within the cylinders.

The primary object of my invention is to provide an engine of maximum thermal and mechanical efficiencies and to provide an engine which will deliver a maximum of power from a mechanism limited to both a minimum of overall dimensions and weight. The invention comprises essentially a mechanism having one or more cylinders, a piston in each cylinder, a connecting rod therefor operating a crank assembly, two rotatable inertia storage masses in the form of frames, as above indicated, together with means to employ each of these storage masses as a reactionary inertia resistance against the other mass while the pistons in the cylinders operate to rotate these two frames in opposite directions, the structure being so provided that the fluid pressures in the cylinders are employed to act in effect as a differential medium between those two inertia masses to permit relative rotation therebetween and to have the final driving effect of each being adjusted to any inequalities between the respective loads or resistances opposing rotation of those frames or masses.

A further important object of the invention is to provide an engine wherein the number of power impulses per cylinder per revolution of the flywheel in effect on any cycle of operation will be multiplied as compared to conventional types of engines, wherein such power impulses will be applied simultaneously at diametrically opposite points or zones of the flywheel.

A still further important object of the invention is to make use of the side pressure of the piston within a cylinder as a power force in driving the flywheel or frame.

These and many other objects and advantages of the invention, including the feature of dynamic balancing, high number of explosions for each revolution of the frame with the engine operating on the four-cycle principle; high piston speed with low rotating speed of the main or drive shaft, etc., will become apparent to those versed in the art in the following description of one particular form of the invention as illustrated more or less diagrammatically in the accompanying drawings, in which.

Like characters of reference indicate like parts throughout the several views in the drawings.

As above indicated, the design of the structure embodying the invention provides for relatively high piston speed with relatively low drive shaft speed. In other words, as compared to the heretofore conventional type of reciprocating engine, for a given drive shaft speed, the piston speed has been increased by this invention, in effect by increasing the number of explosions in a four-cycle operation, per revolution of the drive shaft. Referring to the drawings, an outer frame 15 is mounted to revolve between fixed supports 16 and 17. In the form herein shown, this frame 15 has one side fixed to an axially outwardly extending drive shaft 18 revolubly carried by the fixed support member 16. The other side of the frame 15 is mounted on a drive shaft 19 which is revolubly carried by the fixed support 17, relative rotative movement being permitted between the frame 15 and the shaft 19 as will hereinafter be more fully explained. While the member 15 has been designated as a frame, it in reality constitutes an inclosing housing for the balance of the mechanism of the engine.

Figure 1:
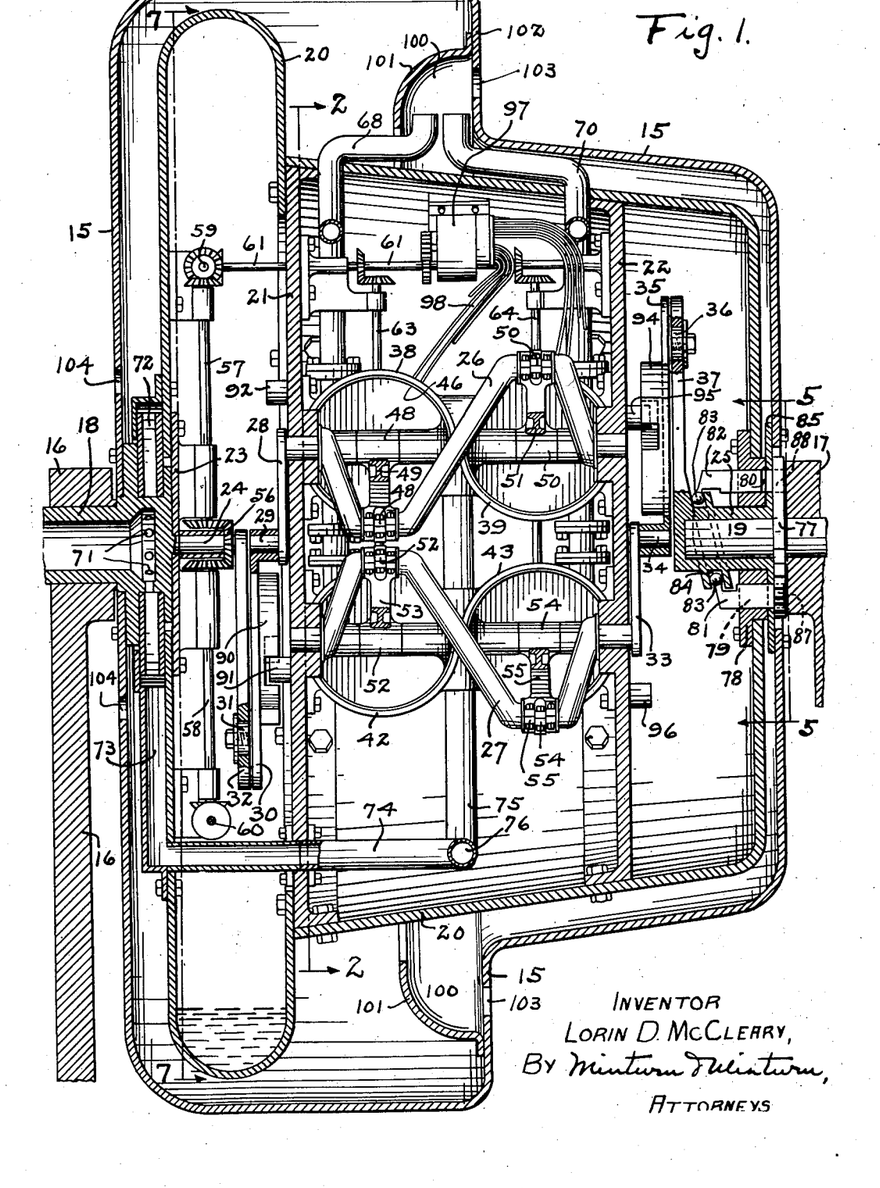
Fig. 1 is a view in vertical, central section through a structure embodying the invention.

Within the frame 15 is revolubly mounted the inner frame 20 which, in the present form, comprises essentially a frusto-conical shell with separate chambers at each end thereof, within which the leverage driving systems are mounted, and a central housing within which are mounted the power cylinders. These three chambers are formed within the frame 20 by means of the partition walls 21 and 22 positioned normally of the axis of rotation of the frame members 15 and 20. The left-hand end of the frame 20, Fig. 1, is revolubly carried about the axis of the drive shaft 18 by any suitable means, herein shown as by means of a bearing plate 23 revolubly fitting on a hub 24 of the shaft 18. The other end of the frame 20 is axially aligned with the shaft 18 by being revolubly mounted on a sleeve 25 revolubly carried on an inner end of the drive shaft 19 and drivingly fixed to the frame 15. In the structure so far described, the frames 15 and 20 are concentrically mounted so that both may revolve about a common axis, the frame 20 within the frame 15.

A crank shaft 26 is revolubly mounted between the partition walls 21 and 22 by ending bearings to have its axis of rotation spaced a distance radially outwardly from the common axis of drive shafts 18 and 19. In the same manner a crank shaft 27 is revolubly mounted by end bearings between the partition walls 21 and 22 to have its axis of rotation spaced an equal radial distance outwardly from the common axis of the drive shafts 18 and 19, the axes of the two crank shafts 26 and 27 and of the shafts 18 and 19 being in a common plane, a vertical plane in Fig. 1.

From the left-hand end of the crank shaft 26, which extends through and beyond the wall 21, is fixed a crank arm 28 to be in the same plane as are the crank pins (two in the present case) of the shaft 26. The crank arm 28 carries a pin 29 on the outer side thereof at a radial distance from the axis of the crank 26 equal to the distance between the axis of the crank shaft 26 and the axis of the drive shafts 18 and 19, the pin 29 being in the position indicated in Fig. 1 concentric with the drive shaft axis.

Rotatably mounted on the pin 29 is a connecting link 30. A pin 31 extends laterally to the left from the lower portion of the link 30 and receives rotatably thereon an outer end portion of a crank arm 32, the other end of which arm 32 is fixed to the drive shaft 18 through the hub 24, this hub in the present showing being an integral part of the shaft 18 and much reduced in diameter from that which would be practically employed, the reduction in diameter being made to facilitate illustration of other adjacent parts.

On the right-hand end of the crank shaft 27, which end extends through the wall 22 of the frame 20, is fixed a crank arm 33 in a position directly opposing the position of the arm 28 on the shaft 26 when those shafts are so turned as indicated in Fig. 1, to have their crank pins all in a common plane. The crank shaft arm 33 carries a fixed pin 34 turned outwardly to the right therefrom at a fixed radial distance from the crank shaft 27 equal to the distance between the axis of that crank shaft and the axis of the drive shafts 18 and 19, whereby the crank pin 34 is positioned to be concentric of that drive shaft axis with the crank shafts in the positions above indicated.

Rotatably mounted by one end on the pin 34 is a connecting link 35. The other end of the link 35 carries a pin 36 rotatably engaged by the outer end of the drive shaft arm 37, this arm 37 being herein shown as an integral part of the sleeve 25 which rotatably receives therein the inner end of the drive shaft 19.

Fixed to and carried between the inner frame walls 21 and 22 are a pair of upper cylinders 38 and 39 on the one side of the crank shaft 26 and a like pair of cylinders 40 and 41 on the other side of the crank shaft 26. These cylinders 38—41 are horizontally disposed and centered on a common plane including the axis of rotation of the crank shaft 26. In like manner, four cylinders, 42, 43 on the one side respectively under cylinders 38 and 39, and 44, 45 on the other side respectively under cylinders 40 and 41, are mounted between the partition walls 21 and 22 in conjunction with the lower crank shaft 27. In other words, in the present form of the invention there are eight power cylinders, four on one side and four on the other side of the axis of the drive shafts 18 and 19.

Figure 2:
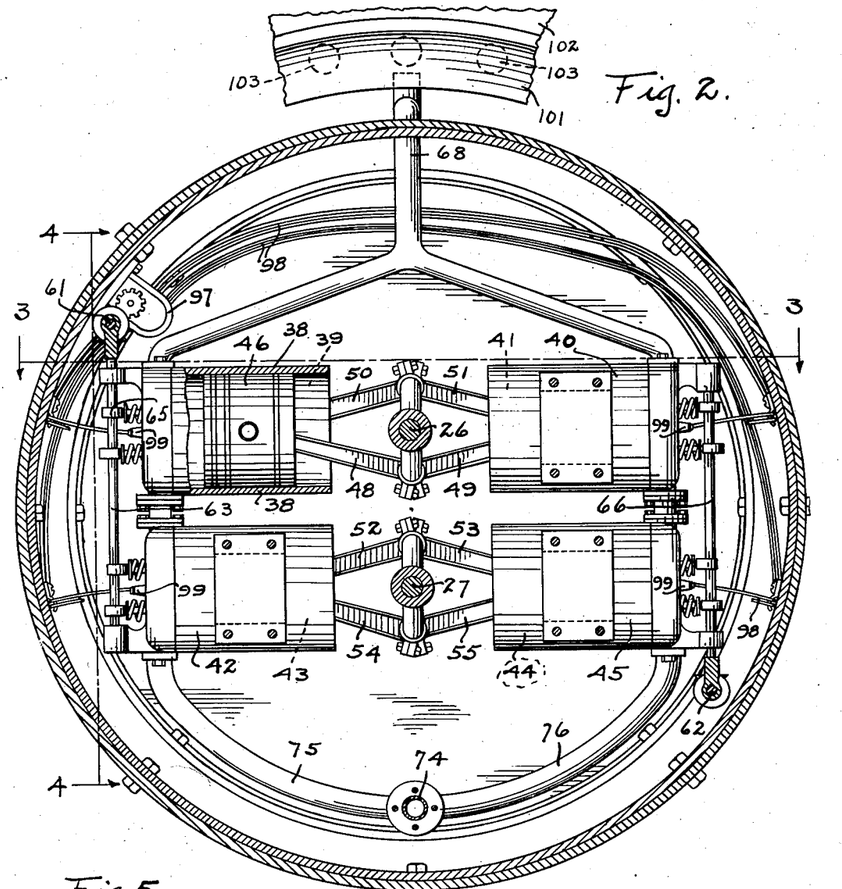
Fig. 2, a view in transverse vertical section on the line 2—2 in Fig. 1.
Figure 3:
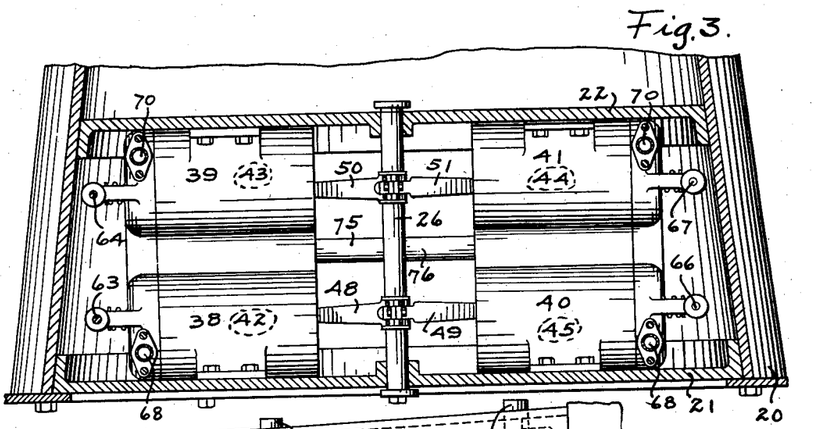
Fig. 3, a view in transverse horizontal section on the line 3—3 in Fig. 2.

In each of these eight cylinders is a piston such as indicated by the piston 46 in the cylinder 38, Fig. 2. From the pistons in the two upper opposing cylinders 38 and 40 extend connecting rods 48 and 49 respectively, each extending angularly downwardly to fit by a forked connection on the left-hand pin, lowermost turned in Fig. 1, of the crank shaft 26. In like manner, from the pistons in the other two upper opposing cylinders 39 and 41 extend respectively upwardly the connecting rods 50 and 51 to fit by a forked arrangement on the uppermost turned pin of the crank shaft 26. It is to be understood that the relative terms "upper" and "lower" and "left-hand" and "right-hand" as applied in the description of the parts herein mentioned apply to the positions as indicated in Fig. 1, these positions, of course, changing during actual operation of the engine.

Referring to the lower bank of cylinders, from the pistons in the two opposing cylinders 42 and 45 extend upwardly connecting rods 52 and 53 respectively to have their ends engage the common, upturned pin of the crank shaft 27. From the pistons in the other two lower opposing cylinders 43 and 44 extend downwardly the respective connecting rods 54 and 55 to have their end bearings engage in forked manner the common, lowermost turned pin of the crank shaft 27.

No means have been shown herein for cooling and for lubricating since the conventional liquid cooling or even air cooling may be employed and any desired type of pressure lubrication may be employed. These two features have not been illustrated in order to avoid complications which would obscure the showing of the actual invention.

Figure 4:
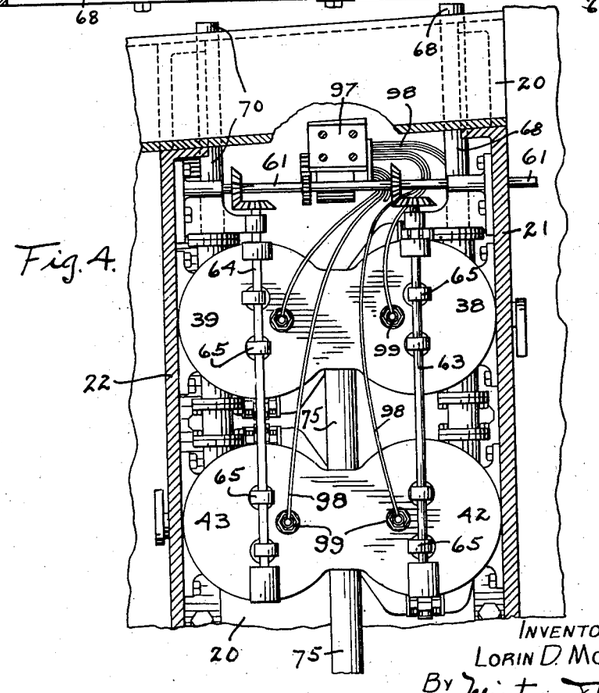
Fig. 4, a view in vertical longitudinal section on the line 4—4 in Fig. 2.

Any suitable means for actuating the valves of the eight cylinders above described may be employed. In the present illustration, a diagrammatic representation of a valve driving mechanism is illustrated wherein from the drive shaft 18 through a bevel gear 56 fixed on the inner end of the hub 24 are driven upper and lower extending shafts 57 and 58 respectively at the same rate of speed as that of the shaft 18. The outer ends of these shafts 57 and 58 respectively carry bevel gears which mesh with gears mounted on transversely extending shafts 59 and 60 respectively, which in turn through suitable miter gears drive longitudinally disposed shafts 61 and 62 respectively. These shafts 61 and 62 extend through the partition wall 21 and are supported by bearings on that wall and also on the other wall 22. The upper shaft 61 in turn drives through miter gears the two vertically disposed cam shafts 63 and 64. These cam shafts 63 and 64 extend across the heads of the cylinders 38, 42 and 39, 43 respectively as best indicated in Fig. 4, in which positions cams 65, suitably mounted therealong in each instance, operate an intake and exhaust valve for each cylinder. In like manner the shaft 62 drives the cam shafts 66 and 67 which operate the intake and exhaust valves for the other cylinders 40, 45 and 41, 44. It is to be noted that a symmetrical arrangement is thus afforded in order to preserve as nearly as possible dynamic balance of the various members when revolved about the axis of the drive shafts 18 and 19.

Some provision is made to conduct exhaust gases from the cylinders and discharge them outside the housing 15. In the present form, an exhaust stack 68 is provided to take the gases from the cylinders 38, 42, 40 and 45, and this stack 68 is formed to extend through the housing 20 to discharge into an annular collector chamber 100 defined by a wall 101 in the nature of a hood fixed to the housing 15 in spaced relation from the vertical wall section 102. In like manner, an exhaust stack 70 conducts gases from the other cylinders to discharge them into this chamber between the walls 101 and 102. The housing wall 102 is provided with a plurality of discharge openings 103. Also, the left-hand housing wall is provided with a plurality of intake openings 104 adjacent the shaft 18. The exhaust of gases from the stacks 68 and 70 into the chamber 100 tend to produce a partial vacuum within the housing 15 whereby air is pulled into the housing 15 through the openings 104, thereby setting up a circulation of air through the housing 15 discharging through the chamber 100 and its discharge openings 103.

It is possible in the structure embodying the invention to employ longer cylinders than are customarily employed in the well known reciprocating type engines, whereby longer piston stroke may be had.

The drive shaft 18 is hollow and carbureted gases from any suitable source (not herein shown) are delivered into the shaft 18, from which shaft these intake gases may escape through a series of holes 71, Fig. 1, into an annular chamber 72 concentric with the shaft 18. From a side of this chamber 72, shown as from the under side in Fig. 1, leads a conduit 73 radially therefrom and thence transversely into the housing 20 below the shaft 60 to connect with a manifold system centrally located between the partition walls 21 and 22. This inner manifolding system comprises essentially the horizontally disposed branch 74 from the inner end of which leads a pair of branches 75 and 76 centrally between the walls 21 and 22 to interconnect with the cylinder heads of the cylinders on each side by suitable forming of passageways within the respective cylinder heads, as is well known in the art and not herein shown in detail, to the respective intake valves. The distribution of the fuel mixture does not in itself constitute the invention per se, the present form of distribution being a permissible one.

The left-hand portion of the housing 20 to the left of the wall 21 is made to have a greater diameter than the other part of the housing in order to form a lubricating oil well wherein the lubricating oil will, during operation of the engine, lie in a continuous ring around this enlarged portion, and from which the oil may be drawn by any suitable means to feed to the various working parts. The precise oiling system, as above indicated, does not constitute the gist of the invention and is purposely omitted to prevent confusion in the showing of the essential parts entering into the invention. It is to be noted, however, that the leverage system on the left-hand side of the wall 21 is within this enlarged part of the housing 20. Furthermore the leverage system to the right of the other wall 22 is likewise contained within a chamber of the housing 20 set off from the cylinder chamber. In practice, suitable hand holds, not shown, would be provided to permit access to the bearings of the leverage systems in each instance.

As above described, there are two drive shafts provided, the shaft 18 on the one side and the shaft 19 on the other side, one shaft turning in the opposite direction from the other. Power may be taken simultaneously from both of these shafts or one shaft may be held stationary to have the deliver power transmitted through the other shaft. In the arrangement above described, when either one of the crank shafts 26 or 27 travels through two revolutions, one frame or housing will travel one revolution when the other frame is held stationary. If the housing 15 is held stationary by fixing the drive shaft 18, then the driving force is from the reaction of the cylinders in relation to the pistons therein. On the other hand, if the housing 20 which carries the cylinders is held stationary through the drive shaft 19, then the engine is driven directly from the pistons. When both housings 15 and 20 are free to revolve, then the reactionary forces upon the cylinders plus the direct drive from the pistons constitutes the two opposing moving forces, one force turning one housing in one direction and the other force turning the other housing in an opposing direction. In other words, an explosion within a cylinder is tended to be driven backward away from the piston to tend in turn to revolve the housing 20. This motive force is augmented by the side pressure of the piston on the cylinder wall due to angularity of the connecting rod. Simultaneously the piston in this cylinder is driven outwardly from the cylinder head to revolve the crank shaft which in turn through the leverage system for that particular crank shaft drives the outside frame 15 in an opposing direction to the direction of travel of the inner frame or housing 20.

Assuming that condition wherein both drive shafts 18 and 19 are free to be driven by their respective housings, it is to be noted that while the outer housing 15 is directly connected to the drive shaft 18, the inner housing 20 cannot be directly connected to the shaft 19 in the form herein shown because the sleeve 25 (fixed to the outer housing 15) revolves in an opposite direction in respect to the direction of travel of the housing 20 having a bearing mounted around the outer side of this sleeve 25.

An ingenious device is employed to transmit power from the housing 20 to this shaft 19. To accomplish this result, the shaft 19 is provided, Figs. 1, 5 and 6, with a flange 77 extending radially therefrom just outside of the housing 15, this flange 77 being in the nature of a disc. The housing 20 is provided with a hub 78 which is that part of the housing bearing on and around the sleeve 25. Through this hub 78 extend two rectangular passageways 79 and 80 centered in diametrical opposition at a common radial distance from the axis of the shaft 19. Slidingly guided through these passageways 79 and 80 are dogs 81 and 82 respectively. The inner end of each of these dogs is provided with a cam following finger 83, herein shown as spherically shaped and engaged within a cam slot 84 formed around the periphery of the sleeve 25 to have this slot inclined from a normal position in relation to the axis of the sleeve 25.

In the present form, the sleeve 25 is provided with an outer flange 85 to which the wall of the housing 15 is secured, this flange and wall of the housing becoming in effect an integral connection with the sleeve 25. This flange 85 is provided with an arcuate slot 86 having a curvature the center of which is the axis of the shaft 19 and the radius of which permits the passageways 79 and 80 to open therethrough. The circumferential length of the slot 86 is less than 360 degrees and in the present showing where two dogs are employed, approximates 270 degrees in length.

Figure 5:
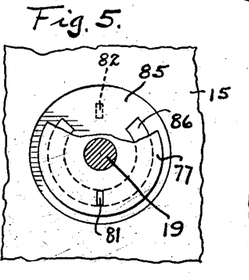
Fig. 5, a view in detail in vertical transverse section on the line 5—5 in Fig. 1.
Figure 6:
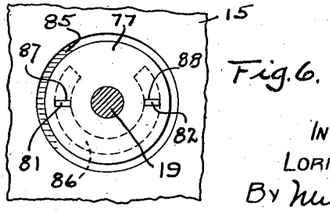
Fig. 6, a similar view showing the parts revolved ninety degrees from those positions shown in Fig. 5.

When the housing 15 is traveling in a counterclockwise direction, Figs. 5 and 6, and the housing 20 with its hub 78 is traveling in a clockwise direction, the dogs 81 and 82 will reciprocate horizontally in directions parallel with the axis of the shaft 19, one dog traveling in the opposite direction to that of the other. The slope of the cam slot 84 is made to be such that when the dog 82 is pulled to its innermost position as indicated in Figs. 1 and 5, the other dog 81 is pushed outwardly to its outermost position. The flange 77 on the shaft 19 is provided with a pair of rectangular holes 87 and 88 therethrough so positioned and shaped as to permit alignment when the shaft 19 is properly rotated with the passageways 79 and 80 in the hub 78. When the dog 81 is in its outermost position as above described, its outer end has passed through the slot 86 and entered into the hole 87 in the flange 77, thereby creating a driving connection between the hub 78 and this flange 77. This driving connection is maintained through the slot 86 until the sleeve 25 has turned sufficiently in one direction and the flange 85 has turned in the other direction to push the dog 82 through the slot 86, Fig. 6, into engagement with the flange 77 through its hole 88 while, but not before, the dog 81 has been pulled inwardly from engagement with the flange 77 in the hole 87. In other words, in the position shown in Fig. 6, both dogs 81 and 82 are in driving connection with the flange 77. Continued relative rotations of the two housings 20 and 15 will cause the dog 81 to be completely retracted from engagement with the flange 77 and pulled on back through the slot 86 so as to permit clearance of that part of the flange 85 which lies between the two ends of the slot 86, the dog 82 then taking the full drive between the members as above indicated. This connection is, of course, repeated during continued rotation of the members, and it is thus to be seen that the inner housing 20 drives the shaft 19.

Figure 9:
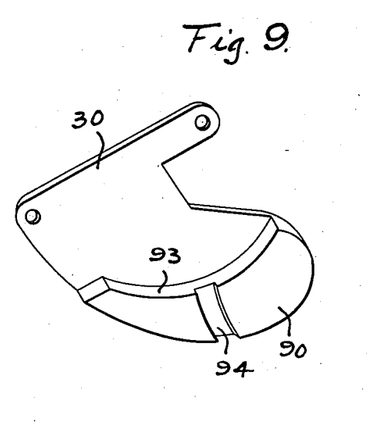
Fig. 9, a view in perspective of the connecting link of the leverage drive system.

The structure so far described, once started, will continue operating without any difficulty in respect to the two leverage systems passing through their "dead centers." However, it may happen that when the engine stops in such a position as substantially illustrated in Fig. 1, the connecting link 30 is in parallel relation with the crank arm 32 on the one side and the link 35 in a similar relation with its crank arm 37 on the other side. Attempting to start the engine then by turning one of the shafts 18 or 19 might have the effect of setting one frame or housing into rotative travel without turning the other housing. To avoid this situation, the connecting link 30 is provided with an extension to one side which carries a cam member 90 presented toward the partition wall 21 and in the path of pins 91 and 92 fixed to and extending from the wall 21. This structure is best illustrated in Fig. 9. The cam member 90 is provided with an arcuate surface 93 and a transverse cam slot 94. The surface 93 comes into contact and is acted upon by the pin 92 whereas the cam slot 94 operates in conjunction with the other pin 91.

Figure 7:
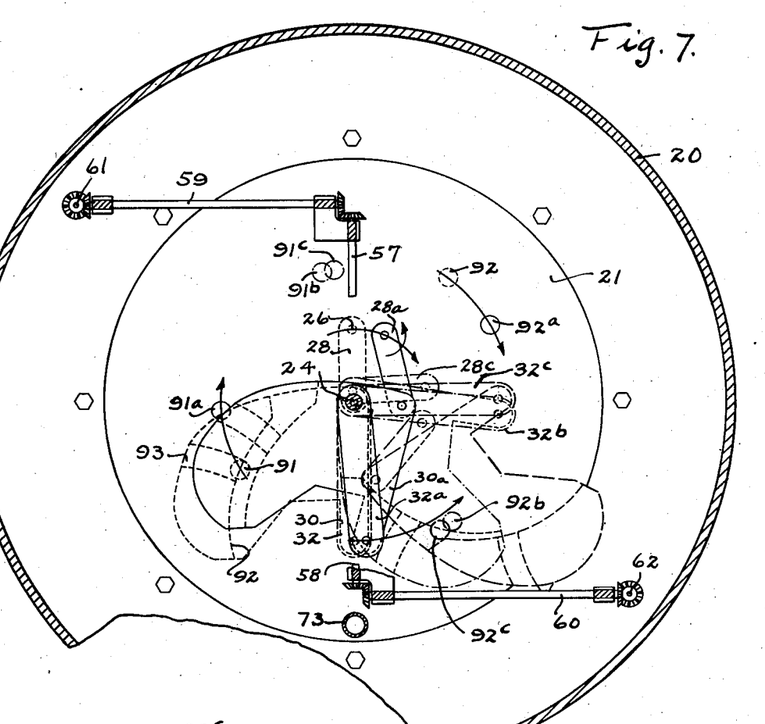
Fig. 7, a view in vertical transverse section on the line 7—7 in Fig. 1.
Figure 8:
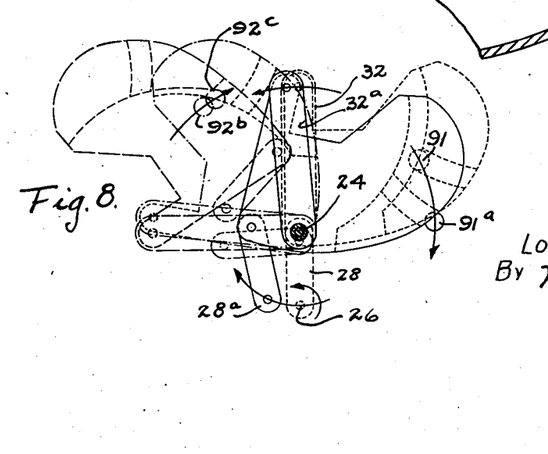
Fig. 8, a diagram illustrating the relative positions of members of the crank leverage system following rotation to positions substantially 180 degrees from those positions indicated in Fig. 7.

The purpose of this cam member 90 with its two cam tracks or surfaces 93 and 94 is to shift quickly the crank arm 32 past its parallel relation with the link 30. This action is best illustrated in Figs. 7 and 8, Fig. 7 illustrating positions comparable to those shown in Fig. 1, and Fig. 8 illustrating those positions of the lever system and cam member when the two housings 15 and 20 have revolved each substantially 180 degrees from the positions indicated in Fig. 7. It is to be understood, however, that the crank arm comes into parallel relation with the connecting link 30 at four different positions for each revolution of the crank arm 32, one when the crank arm 32 is turned downwardly as in Figs. 1 and 7; one when the crank arm 30 is revolved to a substantially horizonal position as indicated by the dash, dot and full dash line positions in Fig 7; when the arm 32 has reached the substantially upper vertically directed position as shown in solid and short dash line in Fig. 8; and when the crank arm 32 has turned on around to the horizontally, left-hand directed position as illustrated in passing through the dash, dot and full dash line positions in Fig. 8.

Referring particularly to Fig. 7, the crank arm 32 and the link 30 with its cam member 90 are shown in initial short dash line positions. The pin 91 (also in short dash lines) is just entering the cam slot 94 to press upwardly therein, whereby continued slight rotation of the crank shaft arm 28 will cause the resultant action of swinging the link 30 and cam member 90 upwardly and to the right and the swinging of the drive shaft crank arm 32 past center to the right, which positions of those three members are illustrated by solid lines, the pin 91 having travelled to the position 91ª of just leaving the cam slot 94. In this travel of the various members, it is to be noted that the crank shaft 26 axis is revolving clockwise; the crank shaft arm 28 is rotating counterclockwise; the drive shaft 18 and its hub 24 are rotating counterclockwise; the drive shaft crank arm 32 also is rotating counterclockwise; and the link interconnecting the crank shaft arm 28 and the drive shaft crank arm 32 serves as the means of pulling around the crank arm 32 to transmit power to the shaft 18. By means of the travel of the cam slot 94 and the pin 91, one relative to the other, the arm 32 and the link 30 are quickly carried past their parallel positions in their downwardly directed positions.

To accomplish the same result when the members 28 and 32 approach their right hand directed, horizontally disposed positions, the pin 92 then in its dash-dot position 92ᵇ strikes the cam surface 93, when the crank arm 32 is in its dash-dot position, to press against the surface 93 and cause the link to kick up the arm 28 to its long dash line position by travel of the crank shaft arm 28 by the time the pin 92 has travelled from position 92ᵇ to 92ᶜ. As indicated in Fig 8, the same resultant actions occur at the other two zones of approaching parallelism—upwardly directed and left-handed, horizontally directed positions. Also the same action occurs between the corresponding members consisting of the crank shaft 27; its crank arm 33; connecting link 35;

its cam member 114, which is identical in respect to its cam surfaces with cam member 90, except that cam members 90 and 114 are carried on inner opposing sides of their respective links; cam actuating pins 95 and 96 fixed on the wall 22 in the path of the cam member 114; and the crank arm 37.

A conventional ignition system is employed. In the form herein shown, a magneto 97 is mounted within the housing 20 to be driven from the shaft 61. From the magneto through its distributor head lead wires 98 in the proper order to the various spark plugs, one for each cylinder.

Figure 10:
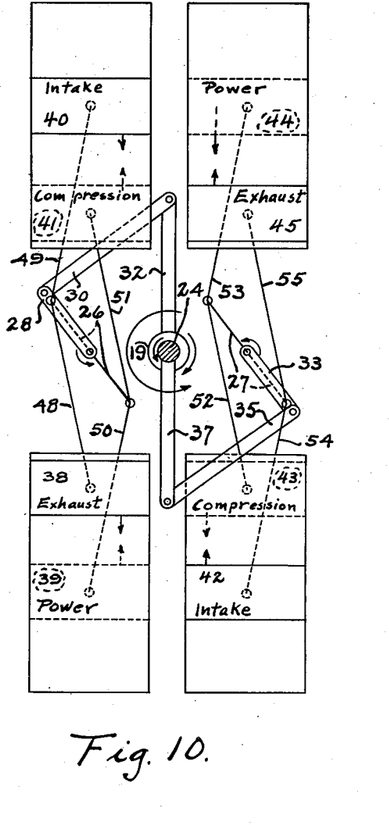
Fig. 10, a diagram of the cylinder and leverage system.

Fig. 10, in diagrammatic form, indicates the firing order with the engine operating upon the four-cycle principle. In the relative piston positions indicated, cylinders 39 and 44 have fired and are delivering power directly by piston outward travel, by cylinder reaction, and by piston side thrust due to piston rod angularity. Cylinders 38 and 45 are exhausting; cylinders 41 and 43 are compressing; and cylinders 40 and 42 are intaking.

The drive shafts 18 and 19 are driven, as above indicated, in opposite directions. The drive from the crank shaft 26 lies between it and the shaft 18 in the leverage system consisting of the crank arms 28 and 32 and the connecting link 30. The drive from the crank shaft 27 lies between it and the drive shaft 19, through the dogs 81, 82, in the leverage system comprising the crank arms 33 and 37 and the connecting link 35. The reaction forces between the cylinders and pistons augment the direct drive by the pistons as above indicated. In the structural embodiment of the invention herein illustrated, the crank shaft arms 28 and 33 are each one-half the effective lengths of their respective drive shaft crank arms 30 and 37.

While the invention has been described in the one best form known to me, it is obvious that the structure may be considerably varied as to mechanical design, the number of cylinders varied, the drive connection between the crank arm and the shaft 19 modified, and so forth, all without departing from the spirit of the invention, and I therefore do not desire to be limited to that precise form other than by the limitations as may be imposed by the following claims.

I claim:

1. The combination of a frame rotatable on an axis; a pair of crankshafts journalled in the frame to have their axes spaced from and in parallel alignment with the frame rotation axis; a plurality of cylinders carried by said frame, each cylinder having a reciprocable piston and a rod connecting the piston with a throw on one of said crankshafts; a pair of drive shafts in axial alignment with the frame axis; a crank arm on each of said crankshafts; a crank arm interconnecting with each of said drive shafts; and a connecting link respectively pivoted to each pair of said crankshaft and drive shaft arms; said frame being drivingly connected with one of said drive shafts.

2. The combination of a frame rotatable on an axis; a pair of crankshafts journalled in the frame to have their axes spaced from and in parallel alignment with the frame rotation axis; a plurality of cylinders carried by said frame, each cylinder having a reciprocable piston and a rod connecting the piston with a throw on one of said crankshafts; a pair of drive shafts in axial alignment with the frame axis; a crank arm on each of said crankshafts; a crank arm interconnecting with each of said drive shafts; and a connecting link respectively pivoted to each pair of said crankshaft and drive shaft arms; said frame being drivingly connected with one of said drive shafts; and a second frame fixed to the other of said drive shafts; said two frames and their connected parts serving as flywheels.

3. The combination of a frame rotatable on an axis; a pair of crankshafts journalled in the frame to have their axes spaced from and in parallel alignment with the frame rotation axis; a plurality of cylinders carried by said frame, each cylinder having a reciprocable piston and a rod connecting the piston with a throw on one of said crankshafts; a pair of drive shafts in axial alignment with the frame axis; a crank arm on each of said crankshafts; a crank arm interconnecting with each of said drive shafts; and a connecting link respectively pivoted to each pair of said crankshaft and drive shaft arms; said frame being drivingly connected with one of said drive shafts; each of said crankshaft crank arms having a radius equal to the distance between the axes of a crankshaft and the drive shafts, said drive shaft crank arms being less than 360 degrees angularly disposed one from the other, and said crankshaft arms also being less than 360 degrees angularly disposed in reference to each other.

4. The combination of a frame rotatable on an axis; a pair of crankshafts journalled in the frame to have their axes spaced from and in parallel alignment with the frame rotation axis; a plurality of cylinders carried by said frame, each cylinder having a reciprocable piston and a rod connecting the piston with a throw on one of said crankshafts; a pair of drive shafts in axial alignment with the frame axis; a crank arm on each of said crankshafts; a crank arm interconnecting with each of said drive shafts; and a connecting link respectively pivoted to each pair of said crankshaft and drive shaft arms; said frame being drivingly connected with one of said drive shafts; a second frame concentrically rotatably mounted about said first frame; said drive shaft crank arms being fixed in relation to said second frame; dog means reciprocably carried by said first frame; said second frame having an arcuate slot through which said dog means may extend; cam means carried by said second frame to reciprocate said dog means; and a member carried by said other drive shaft and having aperture means to receive said dog means therein to drive said other shaft.

5. The combination of a frame rotatable on an axis; a pair of crankshafts journalled in the frame to have their axes spaced from and in parallel alignment with the frame rotation axis; a plurality of cylinders carried by said frame, each cylinder having a reciprocable piston and a rod connecting the piston with a throw on one of said crankshafts; a pair of drive shafts in axial alignment with the frame axis; a crank arm on each of said crankshafts; a crank arm interconnecting with each of said drive shafts; and a connecting link respectively pivoted to each pair of said crankshaft and drive shaft arms; said frame being drivingly connected with one of said drive shafts; each of said crankshaft crank arms having a radius equal to the distance between the axes of a crankshaft and the drive shafts, said drive shaft crank arms being less than 360 degrees angularly disposed one from the other, and said crankshaft arms also being less than 360 degrees angularly disposed in reference to each other; four cylinders being provided for each crankshaft, said cylinders being in parallel alignment, two on each side of each crankshaft to have the pistons and rods of four cylinders driving each crankshaft; and the axes of said crankshafts being in a plane including the common axis of said two drive shafts.

6. The combination of a frame rotatable on an axis; a pair of crankshafts journalled in the frame to have their axes spaced from and in parallel alignment with the frame rotation axis; a plurality of cylinders carried by said frame, each cylinder having a reciprocable piston and a rod connecting the piston with a throw on one of said crankshafts; a pair of drive shafts in axial alignment with the frame axis; a crank arm on each of said crankshafts; a crank arm interconnecting with each of said drive shafts; and a connecting link respectively pivoted to each pair of said crankshaft and drive shaft arms; said frame being drivingly connected with one of said drive shafts; cam means carried by said links; and cam means actuating members carried by said frame for quickly shifting said links and drive shaft crank arms past parallel overlapping positions.

7. The combination of a frame rotatable on an axis; a pair of crankshafts journalled in the frame to have their axes spaced from and in parallel alignment with the frame rotation axis; a plurality of cylinders carried by said frame, each cylinder having a reciprocable piston and a rod connecting the piston with a throw on one of said crankshafts; a pair of drive shafts in axial alignment with the frame axis; a crank arm on each of said crankshafts; a crank arm interconnecting with each of said drive shafts; and a connecting link respectively pivoted to each pair of said crankshaft and drive shaft arms; said frame being drivingly connected with one of said drive shafts; cam means carried by said links; and cam means actuating members carried by said frame for quickly shifting said links and drive shaft crank arms past parallel overlapping positions; said cam means comprising a member having a cam surface with a substantially transverse surface, and the actuating members consisting of a pair of spaced apart pins, one in the path of said cam surface, and the other pin in the path of the transverse surfaces, said surfaces being located in respect to the paths of said pins to have said crankshaft arms pull the links and said cam surfaces against said pins to fulcrum the surfaces thereagainst and thereby aid in rocking the connected drive shaft arms in the direction normally urged by the crankshaft crank arms.

8. In a planetary type engine, a plurality of engine drive cylinders; a frame supporting the cylinders; means rotatably supporting the frame; a crankshaft carried by the frame to rotate on its own axis parallel to and spaced from the frame rotation axis; a number of said cylinders being disposed on opposite sides of said crankshaft to have their axes in a common plane parallel with the frame axis; pistons in all of said cylinders; connecting rods interconnecting the pistons of said number of cylinders with crank pins of said crankshaft; a second crankshaft carried by said frame to rotate on its own axis parallel to and spaced from the frame axis; the axes of the crankshafts being equidistant from and in a common plane with said frame axis, and the remainder of said cylinders being disposed on opposite sides of the second crankshaft to have their axes in a common plane parallel to the axes of the first group of cylinders; a pair of separate drive shafts mounted on an axis in common with said frame rotation axis; drive means between said crankshafts and one of said drive shafts; drive means between said frame and said other drive shaft; said first drive means having a speed reduction to permit a multiple number of revolutions of the crankshafts to each revolution of the drive shafts.

9. In a planetary type engine, a plurality of engine drive cylinders; a frame supporting the cylinders; means rotatably supporting the frame; a crankshaft carried by the frame to rotate on its own axis parallel to and spaced from the frame rotation axis; a number of said cylinders being disposed on opposite sides of said crankshaft to have their axes in a common plane parallel with the frame axis; pistons in all of said cylinders; connecting rods interconnecting the pistons of said number of cylinders with crank pins of said crankshaft; a second crankshaft carried by said frame to rotate on its own axis parallel to and spaced from the frame axis; the axes of the crankshafts being equidistant from and in a common plane with said frame axis, and the remainder of said cylinders being disposed on opposite sides of the second crankshaft to have their axes in a common plane parallel to the axes of the first group of cylinders; a pair of separate drive shafts mounted on an axis in common with said frame rotation axis; drive means between said crankshafts and one of said drive shafts; drive means between said frame and said other drive shaft; said first drive means having a speed reduction to permit a multiple number of revolutions of the crankshafts to each revolution of the drive shafts; said first drive means comprising a crank arm on each of said crankshafts, a crank arm on said one drive shaft, a link interconnecting one of said crankshaft arms with said drive shaft arm, a second crank arm; means fixing the second crank arm in relation to said drive shaft arm, and a link interconnecting the other of said crankshaft arms with said second crank arm; said second drive means comprising members intermittently extending through said second crank arm position fixing means to engage with a member on said other drive shaft.

10. In a planetary type engine, a plurality of engine drive cylinders; a frame supporting the cylinders; means rotatably supporting the frame; a crankshaft carried by the frame to rotate on its own axis parallel to and spaced from the frame rotation axis; a number of said cylinders being disposed on opposite sides of said crankshaft to have their axes in a common plane parallel with the frame axis; pistons in all of said cylinders; connecting rods interconnecting the pistons of said number of cylinders with crank pins of said crankshaft; a second crankshaft carried by said frame to rotate on its own axis parallel to and spaced from the frame axis; the axes of the crankshafts being equidistant from and in a common plane with said frame axis, and the remainder of said cylinders being disposed on opposite sides of the second crankshaft to have their axes in a common plane parallel to the axes of the first group of cylinders; a pair of separate drive shafts mounted on an axis in common with said frame rotation axis; drive means between said crankshafts and one of said drive shafts; drive means between said frame and said other drive shaft; said first drive means having a speed reduction to permit a multiple number of revolutions of the crankshafts to each revolution of the drive shafts; said first drive means comprising a crank arm on each of said crankshafts, a crank arm on said one drive shaft, a link interconnecting one of said crankshaft arms with said drive shaft arm, a second crank arm; means fixing the second crank arm in relation to said drive shaft arm, and a link interconnecting the other of said crankshaft arms with said second crank arm.

11. In a planetary type engine, a plurality of engine drive cylinders; a frame supporting the cylinders; means rotatably supporting the frame; a crankshaft carried by the frame to rotate on its own axis parallel to and spaced from the frame rotation axis; a number of said cylinders being disposed on opposite sides of said crankshaft to have their axes in a common plane parallel with the frame axis; pistons in all of said cylinders; connecting rods interconnecting the pistons of said number of cylinders with crank pins of said crankshaft; a second crankshaft carried by said frame to rotate on its own axis parallel to and spaced from the frame axis; the axes of the crankshafts being equidistant from and in a common plane with said frame axis, and the remainder of said cylinders being disposed on opposite sides of the second crankshaft to have their axes in a common plane parallel to the axes of the first group of cylinders; a pair of separate drive shafts mounted on an axis in common with said frame rotation axis; drive means between said crankshafts and one of said drive shafts; drive means between said frame and said other drive shaft; said first drive means having a speed reduction to permit a multiple number of revolutions of the crankshafts to each revolution of the drive shafts; said first drive means comprising a crank arm on each of said crankshafts, a crank arm on said one drive shaft, a link interconnecting one of said crankshaft arms with said drive shaft arm, a second crank arm; means fixing the second crank arm in relation to said drive shaft arm, and a link interconnecting the other of said crankshaft arms with said second crank arm, the crankshaft crank arm in each drive being half the length of the drive shaft arm.

12. In a planetary type engine, a plurality of engine drive cylinders; a frame supporting the cylinders; means rotatably supporting the frame; a crankshaft carried by the frame to rotate on its own axis parallel to and spaced from the frame rotation axis; a number of said cylinders being disposed on opposite sides of said crankshaft to have their axes in a common plane parallel with the frame axis; pistons in all of said cylinders; connecting rods interconnecting the pistons of said number of cylinders with crank pins of said crankshaft; a second crankshaft carried by said frame to rotate on its own axis parallel to and spaced from the frame axis; the axes of the crankshafts being equidistant from and in a common plane with said frame axis, and the remainder of said cylinders being disposed on opposite sides of the second crankshaft to have their axes in a common plane parallel to the axes of the first group of cylinders; a pair of separate drive shafts mounted on an axis in common with said frame rotation axis; drive means between said crankshafts and one of said drive shafts; drive means between said frame and said other drive shaft; said first drive means having a speed reduction to permit a multiple number of revolutions of the crankshafts to each revolution of the drive shafts; said first drive means comprising a crank arm on each of said crankshafts, a crank arm on said one drive shaft, a link interconnecting one of said crankshaft arms with said drive shaft arm, a second crank arm; means fixing the second crank arm in relation to said drive shaft arm, and a link interconnecting the other of said crankshaft arms with said second crank arm; and cam means for shifting the drive shaft arms and their connected links past parallel overlying positions.

13. In a planetary type engine, a plurality of engine drive cylinders; a frame supporting the cylinders; means rotatably supporting the frame; a crankshaft carried by the frame to rotate on its own axis parallel to and spaced from the frame rotation axis; a number of said cylinders being disposed on opposite sides of said crankshaft to have their axes in a common plane parallel with the frame axis; pistons in all of said cylinders; connecting rods interconnecting the pistons of said number of cylinders with crank pins of said crankshaft; a second crankshaft carried by said frame to rotate on its own axis parallel to and spaced from the frame axis; the axes of the crankshafts being equidistant from and in a common plane with said frame axis, and the remainder of said cylinders being disposed on opposite sides of the second crankshaft to have their axes in a common plane parallel to the axes of the first group of cylinders; a pair of separate drive shafts mounted on an axis in common with said frame rotation axis; drive means between said crankshafts and one of said drive shafts; drive means between said frame and said other drive shaft; said first drive means having a speed reduction to permit a multiple number of revolutions of the crankshafts to each revolution of the drive shafts; said first driving means including crankshaft driven members and a drive shaft driven member, said crankshaft driven members revolving in common directions, and said drive shaft driven members being mounted to likewise revolve in the same directions.

14. In a prime mover, a pair of rotatable members; an engine carried by one of the members; coupling means between said engine and the other of said members arranged to transfer the reaction effect of the engine thereto; and further coupling means between said engine and said one member to apply the driving force of the engine thereto, whereby both members are driven in opposite directions to give a resultant over-all drive.

15. In a prime mover employing fluid pressures as a source of energy, a rotatable frame carrying cylinder and piston assemblies for converting said fluid pressures into mechanical power; a member journalled to rotate in the opposite direction of said frame; members connecting said pistons to a crank in turn drivingly connected with said journalled member; and a shaft driven by said rotatable frame having imparted thereto the torque reaction from said cylinders, said journalled member having imparted thereto the direct torque action imparted by said pistons.

LORIN D. McCLEARY.